US008985135B2

(12) United States Patent
Mitchell

(10) Patent No.: US 8,985,135 B2
(45) Date of Patent: Mar. 24, 2015

(54) SYSTEM FOR DOSING FLUID

(75) Inventor: Grant Sidney Mitchell, Warana (AU)

(73) Assignee: Quik Corp Fire Pty Ltd, Warana, Queensland (AU)

( * ) Notice: Subject to any disclaimer, the term of this patent is extended or adjusted under 35 U.S.C. 154(b) by 0 days.

(21) Appl. No.: 13/983,163

(22) PCT Filed: Jan. 24, 2012

(86) PCT No.: PCT/AU2012/000051

§ 371 (c)(1), (2), (4) Date: Aug. 1, 2013

(87) PCT Pub. No.: WO2012/103569

PCT Pub. Date: Aug. 9, 2012

(65) Prior Publication Data

US 2013/0306164 A1 Nov. 21, 2013

(30) Foreign Application Priority Data

Feb. 2, 2011 (AU) ................................ 2011900318

(51) Int. Cl.
*B01F 1/00* (2006.01)
*B01D 11/02* (2006.01)

(52) U.S. Cl.
CPC ............. *B01F 1/0038* (2013.01); *B01F 1/0033* (2013.01)
USPC ............................ 137/268; 422/264; 422/275

(58) Field of Classification Search
USPC .................................. 137/268; 422/264, 275
See application file for complete search history.

(56) References Cited

U.S. PATENT DOCUMENTS

| | | | | | |
|---|---|---|---|---|---|
| 3,933,169 | A * | 1/1976 | Halley | ......................... | 137/268 |
| 4,545,917 | A * | 10/1985 | Smith et al. | ................... | 510/224 |
| 4,546,503 | A | 10/1985 | Casberg | | |
| 4,571,327 | A | 2/1986 | Larson et al. | | |
| 6,178,987 | B1 * | 1/2001 | Caruthers et al. | ............. | 137/268 |
| 6,397,879 | B1 * | 6/2002 | Ring et al. | .................... | 137/268 |
| 7,658,844 | B2 * | 2/2010 | Blanchette | ................. | 210/198.1 |
| 2009/0301741 | A1 | 12/2009 | Mitchell et al. | | |

OTHER PUBLICATIONS

ISA/AU, Australian Patent Office, International Search Report of International Patent Application No. PCT/AU2012/000051, Feb. 21, 2012.

* cited by examiner

*Primary Examiner* — Kevin Lee
(74) *Attorney, Agent, or Firm* — Brinks Gilson & Lione

(57) ABSTRACT

A system for dosing a stream of fluid with at least one active substance is provided. The system includes a housing which defines a chamber having an inlet and an outlet to enable the flow of fluid through the chamber. The system also includes a block containing the active substance, the block including a body having an outer surface and a passage therethrough defining an inner surface. The block is positioned within the housing chamber in an operative position between the inlet and the outlet so that in use fluid flows over the inner and outer surfaces of the block to dissolve and/or erode the block.

25 Claims, 12 Drawing Sheets

SYSTEM FOR DOSING FLUID

FIELD OF DISCLOSURE

The present disclosure relates to blocks containing an active substance which dissolve into or are eroded by a flow of fluid and to systems and apparatuses for enabling their use.

BACKGROUND

Systems have been previously proposed which provide in-line mixing of a substance such as a fire retardant foaming agent or a fertiliser for example with water by flowing the water past a block containing the substance such that block dissolves or erodes to dose the water with the substance.

One of the problems with any such system is being able to control the rate of dosing of the substance in the water as it flows past the block, so that a generally constant composition of the mixture or solution is provided.

SUMMARY OF THE DISCLOSURE

According to one aspect of the disclosure there is provided a system for dosing a stream of fluid with at least one active substance, the system comprising:

a housing which defines a chamber having an inlet and an outlet to enable the flow of fluid through the chamber; and a block containing the active substance, the block comprising a body having an outer surface and a passage therethrough defining an inner surface, and wherein the block is positioned within the housing chamber in an operative position between the inlet and the outlet so that in use fluid flows over the inner and outer surfaces of the block to dissolve and/or erode the block.

According to a further aspect of the disclosure, there is provided a block for dosing a stream of fluid with at least one active substance, the block containing the active substance and comprising a body having an outer surface and a passage therethrough defining an inner surface, and wherein the block is configured to be used so that fluid flows over the inner and outer surfaces of the block to dissolve and/or erode the block.

Throughout the specification, the term “active substance” is intended to mean any substance that is to be added to the stream of fluid to achieve a function within the fluid and/or by the application of the stream of fluid. For example, the active substance may be a surfactant for fire fighting applications, a detergent for cleaning applications, a fertiliser, pesticide, insecticide or herbicide for agricultural or gardening applications, a foam stabiliser or a corrosion inhibitor.

The block has a first end and a second end and the inner and outer surfaces preferably extend longitudinally between the first and second ends.

The block may have a first face at its first end and a second face at its second end and the inner and outer surfaces may be generally perpendicular to the first and second faces.

The passage of the block may extend longitudinally between the block’s first and second ends, preferably opening in the first and second faces.

The block may be of approximately constant thickness between its inner and outer surfaces along the length of the block.

The block may comprise a carrier material through which the at least one active substance is distributed.

The carrier material may be soluble in water.

The carrier material may be polyethylene glycol having an average molecular weight of 1000-8000 MW.

The block may be positioned in its operative position within the chamber such that its inner and outer surfaces are generally parallel to the direction of flow of fluid between the inlet and outlet of the chamber.

The block may be positioned in its operative position within the chamber such that its first face faces the inlet of the chamber and its second face faces the outlet of the chamber.

The system may also comprise a holding assembly for holding the block in its operative position within the chamber between the inlet and the outlet.

The holding assembly may comprise a first plate and a second plate and wherein the block is held between the plates in its operative position.

The chamber has an inner side surface(s) and each plate has a peripheral edge which may be configured to abut the inner side surface(s) of the chamber.

The first face of the block may butt against a surface of the first plate and the second face of the block may abut against a surface of the second plate when the block is in its operative position.

The holding assembly may comprise at least one fastener for fastening the block to minimise lateral movement relative to the first and second plates.

The at least one fastener may comprise one or more spikes projecting from a surface from the first and/or second plates which engage the block in its operative position.

Each spike may engage a portion of the block which is approximately equally spaced between its inner and outer surfaces.

Each plate may have a plurality of spikes projecting from a surface and which are arranged in a circular array.

Each plate may have apertures to enable the passage of fluid past the plates.

The holding assembly may also comprise one or more positioning members for positioning the block in its operative position within the chamber.

The positioning member(s) may position the block relative to the first and/or second plates.

The positioning member(s) may comprise at least two rods extending longitudinally within the chamber.

In its operative position, the inner surface of the block may abut the rods. However, in another form the outer surface of the block abuts the rods.

The rods may project from a surface of the second plate and the first plate may have apertures to enable the plate to fit over the rods.

The holding assembly may also comprise a first spacing arrangement for spacing the holding assembly away from the chamber inlet and may also comprise a second spacing arrangement for spacing the holding assembly away from the chamber outlet.

The chamber may have a first end wall in which the inlet is located and the first spacing arrangement may comprise at least one spacing member that extends between the first plate and the first end wall.

The chamber may have a second end wall in which the outlet is located and the second spacing arrangement may comprise at least one spacing member that extends between the second plate and the second end wall.

Each spacing member may comprise a portion of one of the positioning members.

In another embodiment, each spacing member may comprise the head of a pin that is inserted through the respective plate and into the block. In this embodiment, the pins act also as the fasteners for fastening the block to minimise lateral movement relative to the first and second plates.

The system may also comprise a fluid flow distributor to distribute the fluid entering the chamber through the chamber's inlet to flow over the inner and outer surfaces of the block.

The fluid flow distributor may comprise a plate having an inner set of apertures for directing fluid to flow over the inner surface of the block and an outer set of apertures for directing fluid to flow over the outer surface of the block.

The flow distributor plate has a peripheral edge which may abut the inner side surface(s) of the chamber.

The inner set of apertures may be arranged in a circular array and the outer set of apertures may be arranged in a circular array.

In one particular form, the flow distributor plate is the first plate of the holding assembly.

The ratio of the total cross-sectional area of the inner set of apertures to the total cross-sectional area of the outer set of apertures may be generally equal to the ratio of the surface area of the inner surface of the block to the surface area of the outer surface of the block. Without wishing to be bound by theory, it is understood that having these generally equal ratios enables the increase in the dissolution/erosion rate of the inner surface of the block (as its surface area increases) to be generally equal to the decrease in the dissolution/erosion rate of the outer surface of the block (as its surface area decreases), for a constant flow rate of fluid through the chamber.

The sum of the cross-sectional area of the inner and outer sets of apertures may be generally equal to the cross-sectional area of the inlet to the chamber.

According to a further aspect of the disclosure, there is provided a block for dosing a stream of fluid of the system having any one or more features of the block described above.

According to another aspect of the disclosure there is provided an apparatus for use in dosing a stream of fluid with at least one active substance from a block containing the active substance, the apparatus comprising:

a housing which defines a chamber having an inlet and an outlet to enable fluid to flow through the chamber; and a holding assembly for holding the block in an operative position within the chamber between the inlet and the outlet.

The housing and the holding assembly of the apparatus may have any one or more of the features described above in respect of the system.

According to a further aspect of the disclosure, there is provided a block for dosing a stream of fluid with at least one active substance and for use with the apparatus having any one or more of the features of the apparatus described above.

BRIEF DESCRIPTION OF THE DRAWINGS

Embodiments will now be described, with reference to the accompanying drawings, in which.

DETAILED DESCRIPTION OF EMBODIMENTS

Figure 1:
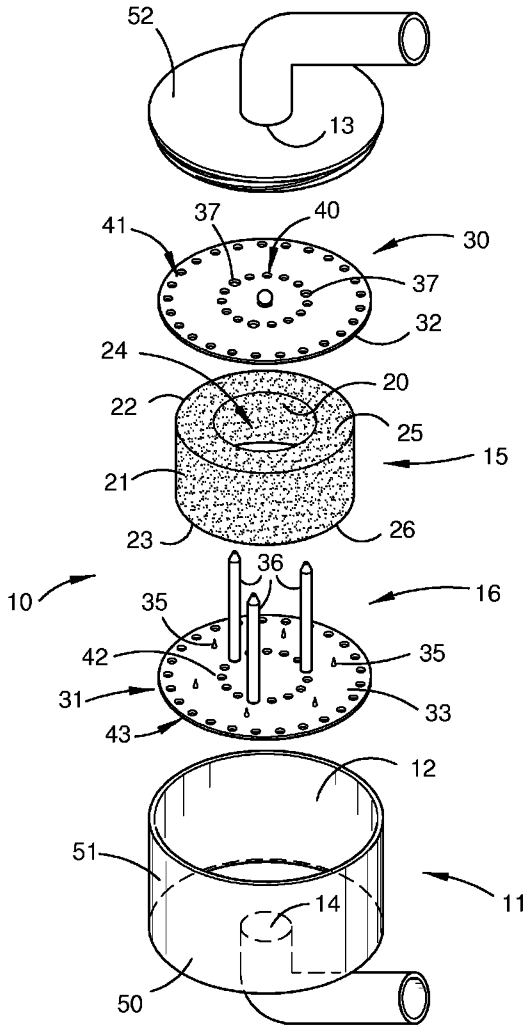
FIG. 1 is an exploded perspective view of a system for dosing a stream of fluid with at least one active substance according to an embodiment.
Figure 2:
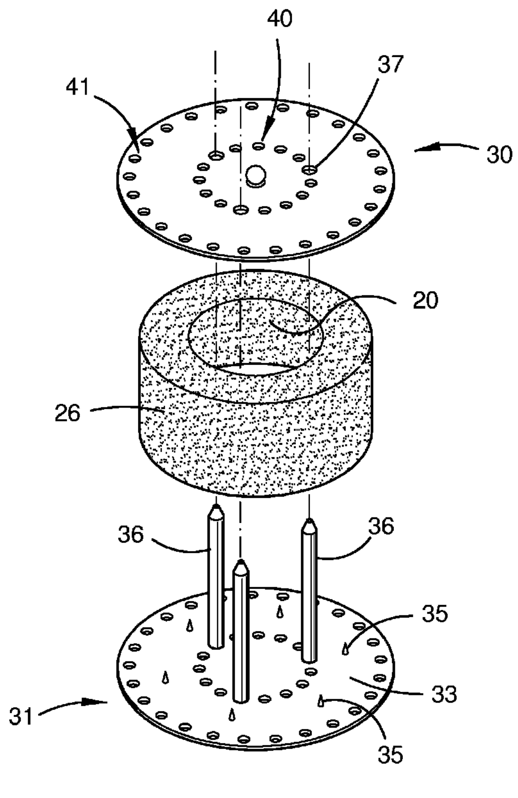
FIGS. 2-6 are perspective views of the system of FIG. 1 at various stages of assembly.
Figure 3:
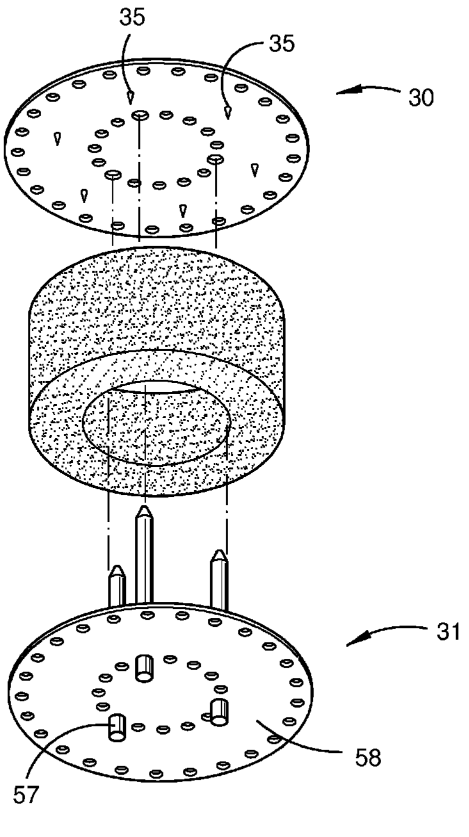

Referring to FIGS. 1-7, a system 10 for dosing a stream of fluid with at least one active substance according to an embodiment the disclosure herein is shown. The system 10 comprises a housing 11 which defines a chamber 12 having an inlet 13 and an outlet 14 to enable fluid to flow through the chamber. Inside the chamber 12 is located a solid block 15 containing the active substance(s). The system 10 also comprises a holding assembly 16 to hold the block 15 in an operative position within the chamber 12 during use of the system.

The block 15 is an annular or hollow cylinder in shape, although it may be of any other suitable shape such as a square or rectangular prism based shape. The block 15 thus has a passage 24 extending through the body of the block and defining an inner surface 20 having an inner surface area. The body of the block also defines an outer surface 21 having an outer surface area. The block also has first and second ends 22, 23. The inner and outer surfaces 20,21 extend longitudinally between the first and second ends such that the passage 24 defined by the block opens in a first face 25 of the block at its first end 22 and a second face 26 of the block at its second end 23. The inner and outer surfaces 20,21 are generally perpendicular to both of the first and second faces 25, 26. The passage 24 is also centrally located in the block such that the longitudinal axis of the passage 24 is co-axial with the longitudinal axis of the block 15. Thus, the block 15 is of approximately constant thickness between inner and outer surfaces 20, 21 along the length of the block between its first and second ends 22, 23. Although the block may be of other dimensions, in one form the block has a height of 50 mm, an outer diameter of 90 mm and an inner diameter of 40 mm. Such a block has been found to be suitable for dosing 1000 litres of water.

The composition of the block 15 is dependent on the application for which it is to be used. The active substance(s) in the block 15 may consist of surfactants for fire fighting applications, detergents for cleaning applications or fertilisers, pesticides, insecticides or herbicides for agricultural or gardening applications or any other one or more active ingredients as desired. The one or more active substances may also comprise a foam stabiliser(s) and may also comprise a corrosion inhibitor(s).

In any of these applications, the block 15 also consists of a solid carrier for carrying the active substance(s). The active substance(s) are evenly distributed throughout the solid carrier matrix. A suitable solid carrier is polyethylene glycol having an average molecular weight of between 1000 and 8000 MW. However, any other suitable substance may be employed as the solid carrier, which is preferably water soluble.

Although the block may be of other dimensions, in one form the block has a height of 50 mm, an outer diameter of 90 mm and an inner diameter of 40 mm. Such a block (formed of polyethylene glycol) has been found to be suitable for dosing 1000 litres of water.

Figure 4:
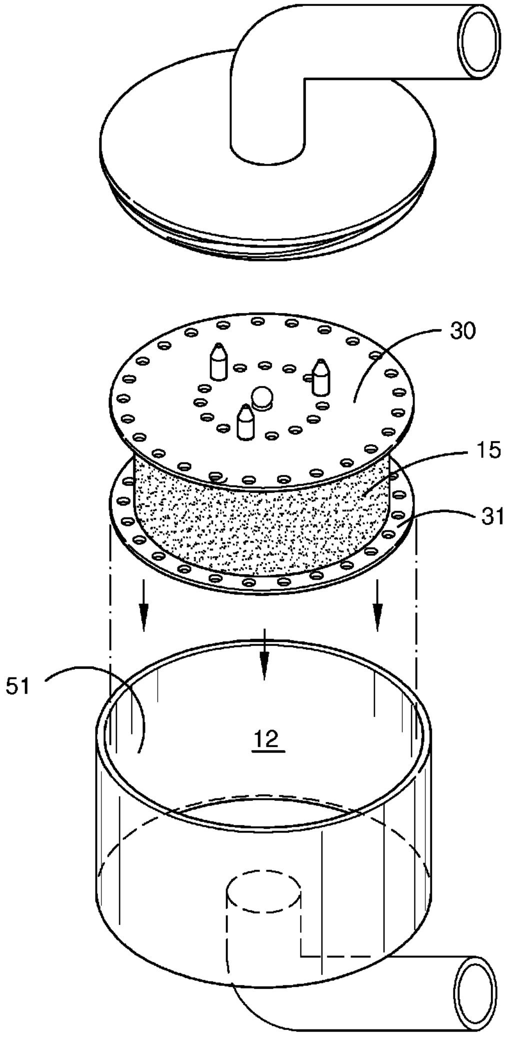
Figure 5:
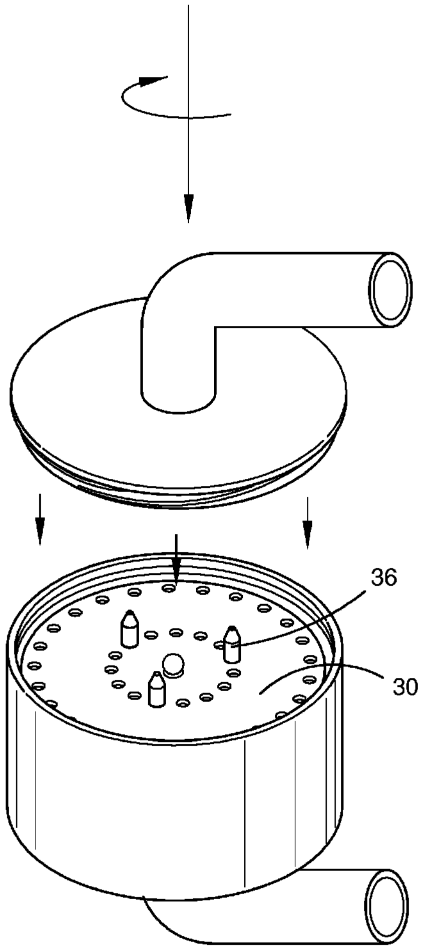
Figure 6:
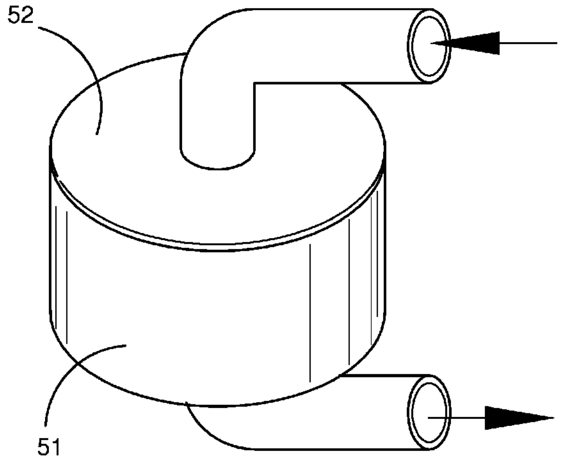
Figure 7:
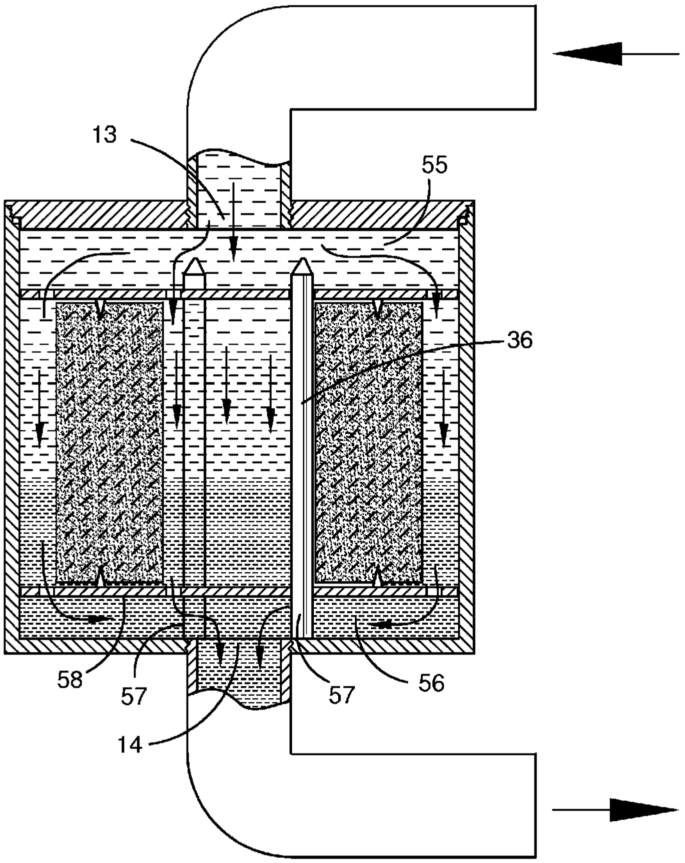
FIG. 7 is a cut-away view of the system of FIG. 1 during use.
Figure 8:
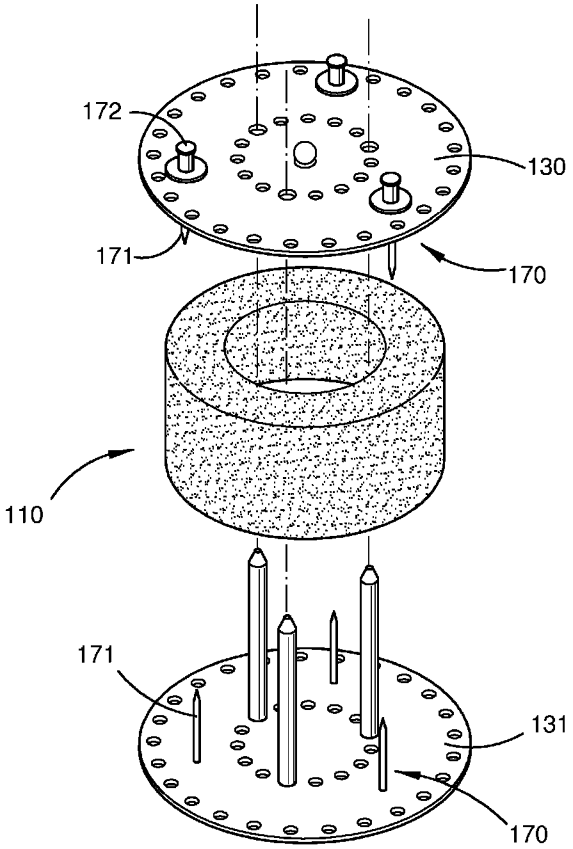
FIG. 8 is an exploded perspective view of a system for dosing a stream of fluid with at least one active substance according another embodiment.
Figure 9:
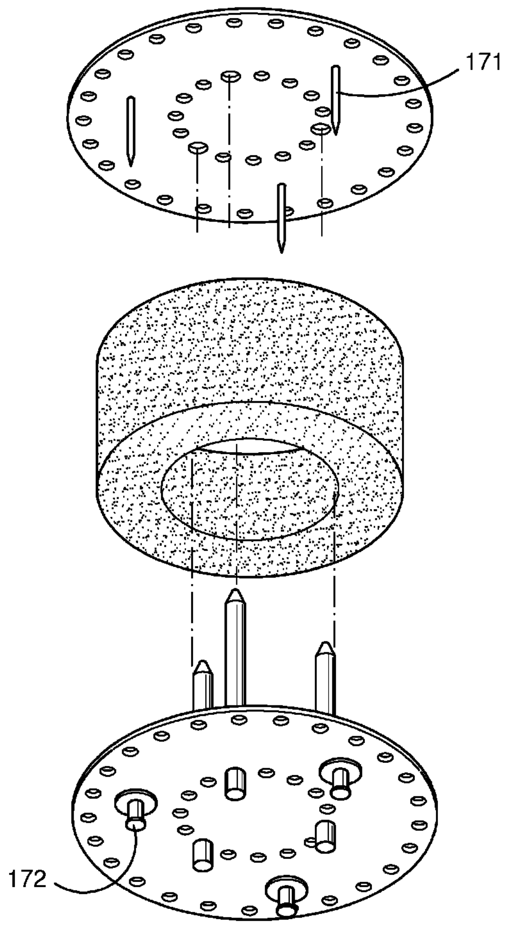
FIGS. 9 and 10 are perspective views of the system of FIG. 8 at various stages of assembly.
Figure 10:
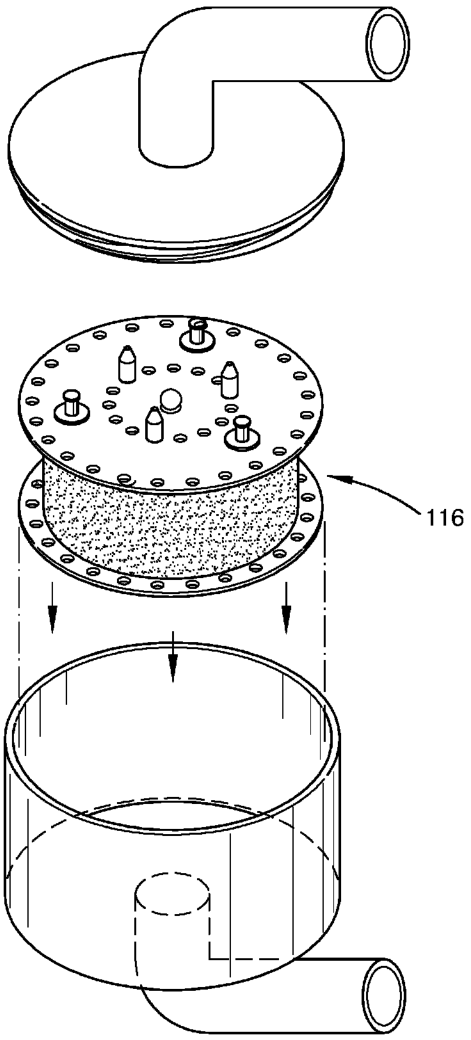
Figure 11:
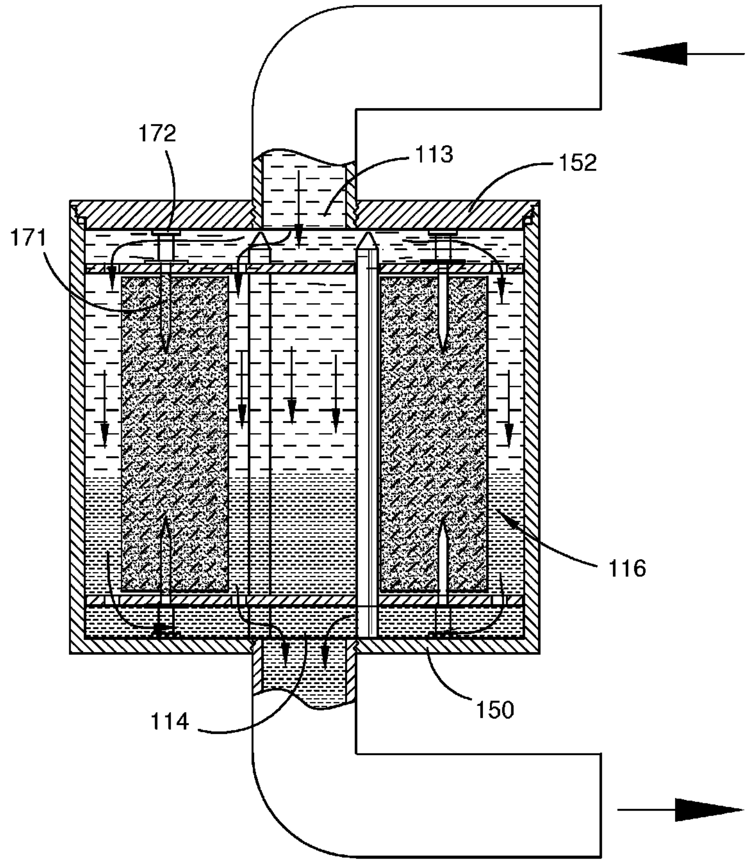
FIG. 11 is a cut-away view of the system of FIG. 8 during use.

The holding assembly 16 comprises first and second plates 30, 31 between which the block 15 is sandwiched (see FIG. 4). Each plate 30, 31 has inner and outer surfaces with the inner surfaces 32, 33 of the plates facing each other. The block 15 is held such that the first face 25 of the block abuts and is flush against the inner surface 32 of the first plate 30 and the second face 26 of the block abuts and is flush against the inner surface 33 of the second plate 31. This acts against fluid flowing over the first and second faces in use, which is important in maintaining a generally constant rate of dosing of the active substance into the fluid as it flows through the chamber. Each plate 30, 31 is a generally circular disc and they are configured such that the centre of each plate is axially aligned with central longitudinal axis of the block passage 24 when the block 15 is assembled with the holding assembly 16.

The holding assembly 16 also comprises fastener(s) in the form of spikes 35 on the inner surfaces 32, 33 of the plates 30, 31 which engage the block 15 and minimise lateral movement of the block relative to the plates including after the block has been used and is partially dissolved. The spikes 35 dig into the block at the block's first and second ends respectively when the block is assembled with the holding assembly. The spikes 35 are arranged in a circular array and are positioned on the inner surfaces of the plates such that they each engage a portion of the block which is generally equally spaced between its inner and outer surfaces 20,21 when the block 15 is assembled with the holding assembly 16.

Although these fasteners are shown in the form of spikes 35 in the FIGS. 1-7, other arrangements could be used such as for example a ridge or a plurality of ridge portions. In this embodiment, the block 15 may have a groove or groove portions formed in each of its first and second faces for receiving the ridge or ridge portions when assembled with the holding assembly.

The holding assembly 16 also comprises positioning members in the form of three rods 36 projecting from the inner surface 33 of the second plate 31. The rods 36 are equidistantly spaced from the centre of the second plate 31 and are arranged so that the passage 24 of the block 15 can fit over all of the rods 36 with the inner surface 21 of the block 15 butting against each of the rods 36. In this way, the rods 36 accurately position the block 15 with respect to the second plate 31 when they are assembled prior to use.

The rods 36 are of greater length than the length of the block 15 and the first plate 30 of the holding assembly 16 is also provided with apertures 37, one for each of the rods 36 to extend through at their distal ends from the second plate 31. This enables the first plate 30 to be accurately positioned with respect to both the second plate 31 and the block 15. The apertures 37 are equidistantly spaced from the centre of the first disc 30 in a circular array. The distal ends of the rods may be threaded so that nuts can be applied to tighten and fasten the block between the plates.

Although in the embodiment shown in FIGS. 1-7, the holding assembly 16 has three rods, more or less rods may be incorporated into the assembly. In other embodiments, different forms of positioning members may be used to accurately position the block with respect to the second plate such as spigots, a ridge or ridge portions. In one form, each of the first and second plates has separate positioning members for positioning each plate with respect to the block. For example, each plate may have spigots, provided on their respective inner surface and spaced equidistantly around the centre of that plate, which are received in the passage of the block and abutting the block's inner surface when the plates are assembled with the block.

The first plate 30, which when the system 10 is assembled is located proximate to the inlet 13 of the chamber 12, also acts a fluid flow distributor to distribute the fluid after it enters the chamber 12 through its inlet 13 to flow past the inner and outer surfaces 20, 21 of the block. To achieve this, the first plate 30 comprises inner and outer sets of apertures 40, 41. The outer set of apertures 41 are provided in a circular array around the periphery of the first plate 30, so that fluid which passes through the outer set of apertures flows past the outer surface 21 of the block 15. The inner set of apertures 40 provided in a circular array (that is generally parallel to the outer array) towards the centre of the first plate 30, so that fluid which passes through the inner set of apertures flows past the inner surface 20 of the block 15. In the embodiment shown in FIGS. 1-7, the apertures 37 through which the rods 36 extend to position the first plate 30 with respect to the second plate 31 are located within the array of this inner set of apertures 40.

In the embodiment shown in FIGS. 1-7 the apertures in the inner set 40 are of generally the same size and shape as the apertures in the outer set 41 and that there are more apertures in the outer set than in the inner set. However, the apertures in each set may be of any shape or number provided that during operation, for a constant flow rate of fluid through the chamber 12, the increase in the dissolution/erosion rate of the inner surface of the block (as its surface area increases) is generally equal to the decrease in the dissolution/erosion rate of the outer surface of the block (as its surface area decreases). This is achieved, at least in part, by designing the inner and outer sets of apertures 40, 41 such that the ratio of the total cross-sectional area of the inner set to the total cross-sectional area of the outer set is generally equal to the ratio of the surface area of the inner surface 20 of the block to the surface area of the outer surface 21 of the block. The aperture design should also be such that there is an even flow of fluid across the inner and outer surfaces of the block respectively, hence why in the embodiment shown in FIGS. 1-7 the inner and outer sets of apertures 40, 41 are organised in circular arrays. These design features ensure that the rate of dosing of the active substance to the fluid as it passes through the chamber 12 remains generally constant for a constant fluid flow rate over the life time of the block 15 even though the surface area of the inner surface increases as it dissolves and/or erodes and the surface area of the outer surface decreases as it dissolves and/or erodes. Towards the end of the life of the block, it has been found that a thin tubular ring of the block material remains centred on the spikes 35.

The inner and outer sets of apertures 40, 41 are also designed so that the sum of the cross-sectional area of the inner and outer sets is generally equal to the cross-sectional area of the inlet 13 to the chamber 12. This is to minimise the pressure drop across the chamber 12.

The second plate 31, which when the system 10 is assembled is located proximate to the outlet 14 of the chamber 12, may also have a inner and outer sets of apertures 42, 43 as shown in FIGS. 1-7. The apertures in the second plate 31 are generally in alignment with the apertures in the first plate 30. However, in other embodiments, broader inner and outer openings may be provided in the second plate 31 in place of the sets of apertures.

Although in the embodiment shown in FIGS. 1-7 and described above the first plate of the holding assembly acts as a flow distributor of the fluid to the inner and outer surfaces of the block, in other embodiments, the first plate may have wide inner and outer openings to allow the free passage of fluid and a separate flow distributor may be incorporated with the system.

The housing 11 is cylindrical in shape in conformity with the cylindrical shape of the block 15 and the circular shape of the plates 30, 31. However, the housing may be of other suitable shapes generally depending on the shape of the plates and the block. The housing comprises a base 50, a wall 51 (or walls) integrally formed with the base and a removable cap 52 which couples to the wall 51 at its distal end from the base 50 to define and enclose the chamber 12. The distal end of the wall 51 and the cap 52 are provided with screw threads to enable this engagement. An O-ring (not shown) or other suitable arrangement is provided to seal the closure by the cap 52. The outlet 14 from the chamber 12 is formed centrally in the base 50 and the inlet 13 to the chamber 12 is formed centrally in the cap 52. The wall 51 is shaped so that the peripheral edges of the first and second plates 30, 31 of the holding assembly 16 butt against the inner surface of the wall 51. The block 15 is held by the holding assembly 16 within the chamber 12 so that its inner and outer surfaces 20, 21 are generally parallel to the inner surface of the housing wall 51 and also generally parallel to the direction of fluid flow from the inlet 13 to the outlet 14 of the chamber 12.

The holding assembly 16 and the block 15 sit within the chamber 12 defined by the housing 11 such that there is head space 55 above the holding assembly at the inlet end of the of chamber. This is to enable proper distribution of the fluid by the fluid flow distributor in the form of the apertures 40, 41 in the first plate 30 to the inner and outer surfaces 20, 21 of the block respectively. A bottom space 56 is also provided at the outlet end of the chamber below the holding assembly and the block to allow fluid passing across the inner and outer surfaces of the block to exit the same outlet from the chamber. The bottom space 56 is created by legs 57 projecting from the outer surface 58 of the second plate 31 (which may be extensions of the rods 36) which sit on the base 50 of the housing. In another arrangement, the bottom space is created by a lip provided on the inner surface of the wall 51 of the housing above the base 50 on which the second plate 31 sits.

FIGS. 8-11 show a system 110 for dosing a stream of fluid with at least one active substance according to another embodiment of the disclosure which is similar to the system 10 of FIGS. 1-7.

The main difference for the system 110 of FIGS. 8-11 is that the holding assembly 116 comprises a plurality of pins 170 associated with the first and second plates 130, 131 respectively. The pins 170 are inserted through respective plates such that their spike portions 171 extend towards the opposite plate. The head 172 of each pin 170 extends away from the plate in which the pin has been inserted in the opposed direction to its spike portion 171.

The pins 170 provide two functions. Firstly, their spike portions 171 act as the fasteners to minimise lateral movement relative to the first and second plates. As a result, the spikes 35 provided on the plates in the system shown in FIGS. 1-7 are unnecessary. The heads 172 of the pins also provide spacing arrangements at either end of the holding assembly 116 in which they space the holding assembly and in particular the first and second plates 130, 131 away from the chamber inlet 113 and outlet 114 respectively by butting against the housing cap 152 and base 150 respectively. This minimises movement of the holding assembly 116 longitudinally within the chamber so as to avoid the plates 130, 131 getting too close to either the chamber's inlet or the outlet which would undesirably constrict or block fluid flow through the chamber.

Figure 12:
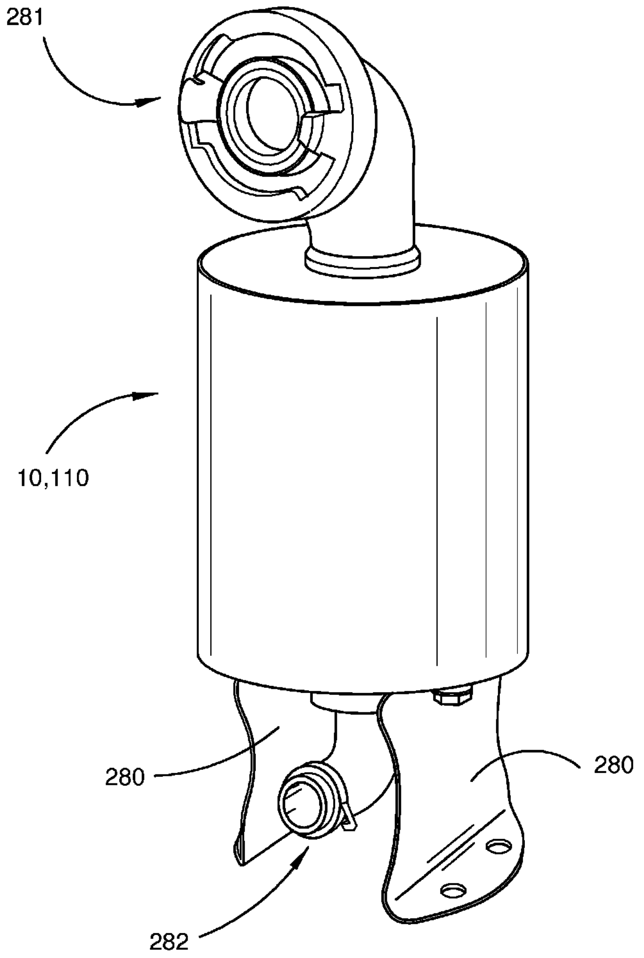
FIG. 12 is a perspective view of an assembled system for dosing a stream of fluid with at least one active substance according to an embodiment.

FIG. 12 shows an assembled system which could be either of the systems 10, 110 shown in FIGS. 1-11. The system 10,110 is provided with fittings to enable use of the system. These fittings include brackets 280 for mounting the system for example to a vehicle such as a ute, tractor or firetruck. In addition an inlet fitting 281 for coupling to a liquid supply conduit such as a fire hose and an outlet fitting 282 for coupling to a liquid outlet conduit are also provided. It is to be appreciated that types of fittings shown in FIG. 12 are only representative and that other suitable fittings may be provided.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

The invention claimed is:

1. A system for dosing a stream of fluid with at least one active substance, the system comprising:

a housing which defines a chamber having an inlet and an outlet to enable the flow of fluid through the chamber;

a block containing the at least one active substance, the block comprising a body having an outer surface and a passage therethrough defining an inner surface, and wherein the block is positioned within the housing chamber in an operative position between the inlet and the outlet so that in use fluid flows over the inner and outer surfaces of the block to dissolve and/or erode the block; and a fluid flow distributor to distribute the fluid entering the chamber through the chamber's inlet to flow over the inner and outer surfaces of the block, wherein the fluid flow distributor comprises a plate having an inner set of apertures for directing fluid to flow over the inner surface of the block and an outer set of apertures for directing fluid to flow over the outer surface of the block.

2. A system as claimed in claim 1, wherein the block has a first end and a second end, the inner and outer surfaces extending longitudinally between the first and second ends.

3. A system as claimed in claim 2, wherein the block has a first face at its first end and a second face at its second end and the inner and outer surfaces are generally perpendicular to the first and second faces and wherein the block is positioned in its operative position within the chamber such that its first face faces the inlet of the chamber and its second face faces the outlet of the chamber.

4. A system as claimed in claim 2, wherein the passage of the block extends longitudinally between the block's first and second ends.

5. A system as claimed in claim 1, wherein the block is of approximately constant thickness between its inner and outer surfaces along the length of the block.

6. A system as claimed in claim 1, wherein the block comprises a carrier material through which the at least one active substance is distributed, wherein the carrier material is soluble in water.

7. A system as claimed in claim 6, wherein the carrier material is polyethylene glycol having an average molecular weight of 1000-8000 MW.

8. A system as claimed in claim 1, wherein the block is positioned in its operative position within the chamber such that its inner and outer surfaces are generally parallel to the direction of flow of fluid between the inlet and outlet of the chamber.

9. A system as claimed in claim 1, wherein the system also comprises a holding assembly for holding the block in its operative position within the chamber between the inlet and the outlet.

10. A system as claimed in claim 9, wherein the holding assembly comprises a first plate and a second plate and wherein the block is held between the plates in its operative position.

11. A system as claimed in claim 10, wherein the chamber has an inner side surface and each plate has a peripheral edge which is configured to abut the inner side surface of the chamber.

12. A system as claimed in claim 10, wherein the holding assembly comprises at least one fastener for fastening the block to minimise lateral movement relative to the first and second plates.

13. A system as claimed in claim 12, wherein the at least one fastener comprises one or more spikes projecting from a surface from the first and/or second plates which engage the block in its operative position.

14. A system as claimed in claim 13, wherein each plate has a plurality of spikes projecting from a surface and which are arranged in a circular array.

15. A system as claimed in claim 10, wherein each plate has apertures to enable the passage of fluid past the plates.

16. A system as claimed in claim 10, wherein the holding assembly also comprises one or more positioning members for positioning the block in its operative position within the chamber.

17. A system as claimed in claim 16, wherein the positioning member(s) comprises at least two rods extending longitudinally within the chamber and wherein, in its operative position, a surface of the block abuts the rods.

18. A system as claimed in claim 10, wherein the flow distributor plate is the first plate of the holding assembly.

19. A system as claimed in claim 1, wherein the ratio of the total cross-sectional area of the inner set of apertures to the total cross-sectional area of the outer set of apertures is generally equal to the ratio of the surface area of the inner surface of the block to the surface area of the outer surface of the block.

20. A system as claimed in claim 1, wherein the sum of the cross-sectional area of the inner and outer sets of apertures is generally equal to the cross-sectional area of the inlet to the chamber.

21. A system as claimed in claim 9, wherein the holding assembly also comprises a first spacing arrangement for spacing the holding assembly away from the chamber inlet and a second spacing arrangement for spacing the holding assembly away from the chamber outlet.

22. An apparatus for use in dosing a stream of fluid with at least one active substance from a block containing the active substance, the apparatus comprising:

a housing which defines a chamber having an inlet and an outlet to enable fluid to flow through the chamber; and a holding assembly for holding the block in an operative position within the chamber between the inlet and the outlet; and a fluid flow distributor to distribute the fluid entering the chamber through the chamber's inlet to flow over the inner and outer surfaces of the block, wherein the fluid flow distributor comprises a plate having an inner set of apertures for directing fluid to flow over the inner surface of the block and an outer set of apertures for directing fluid to flow over the outer surface of the block.

23. A system for dosing a stream of fluid with at least one active substance, the system comprising:

a housing which defines a chamber having an inlet and an outlet to enable the flow of fluid through the chamber;

a block containing the at least one active substance, the block comprising a body having an outer surface and a passage therethrough defining an inner surface, and wherein the block is positioned within the housing chamber in an operative position between the inlet and the outlet so that in use fluid flows over the inner and outer surfaces of the block to dissolve and/or erode the block; and a holding assembly for holding the block in its operative position within the chamber between the inlet and the outlet, the holding assembly comprising:

a first plate and a second plate and wherein the block is held between the plates in its operative position; and one or more positioning members for positioning the block in its operative position within the chamber, wherein the positioning member(s) comprise at least two rods extending longitudinally within the chamber and wherein, in its operative position, a surface of the block abuts the rods.

24. A system as claimed in claim 23, wherein the holding assembly also comprises at least one fastener for fastening the block to minimise lateral movement relative to the first and second plates, the at least one fastener comprising one or more spikes projecting from a surface from the first and/or second plates which engage the block in its operative position.

25. A system as claimed in claim 23, wherein each plate has apertures to enable the passage of fluid past the plates.

* * * * *